United States Patent [19]

Collender

[11] 4,231,642
[45] Nov. 4, 1980

[54] STEREOSCOPIC MOTION PICTURE-CIRCULAR TO LINEAR SCAN TRANSLATOR-METHOD AND APPARATUS

[76] Inventor: Robert B. Collender, 709 Patterson Ave., Glendale, Calif. 91203

[21] Appl. No.: 62,749

[22] Filed: Aug. 1, 1979

[51] Int. Cl.$^3$ ............................................. G03B 35/00
[52] U.S. Cl. ....................................... 352/58; 352/43; 352/81; 353/10
[58] Field of Search ................. 352/58, 81, 43; 353/7, 353/10

[56] References Cited

U.S. PATENT DOCUMENTS

| | | | |
|---|---|---|---|
| 3,482,913 | 12/1969 | Glenn | 352/58 |
| 3,815,979 | 6/1974 | Collender | 352/58 |
| 4,089,597 | 5/1978 | Collender | 352/58 |
| 4,158,487 | 6/1979 | Collender | 352/58 |
| 4,176,923 | 12/1979 | Collender | 352/58 |

Primary Examiner—Monroe H. Hayes

[57] ABSTRACT

My invention relates to photographing scenes with a standard motion picture camera in which there is a relative motion between the scene and camera with the purpose of stereoscopic viewing of the motion picture without the need for viewing aids at the eye. The system is compatible with scenes photographed without this relative motion but the reproduction is flat. The film (or other appropriate media) is arrayed in a vertical plane and constrained to move horizontally around a segment of a circle of radius 2R. At the center of the film circle is a film motion compensator which can be a multi-faceted mirror drum of radius R. The film is rapidly scanned about the center of this circle by a scan projector. Projection optics on the projector, project the sequential film frames onto a relatively large circular cylindrical screen having its vertical axis coincident with the projector axis. The screen is constructed of small vertical segments which are corrugated to cause the incident projection rays to vertically scatter and horizontally reflect such that all rays for a given projection location on the projection circle, will converge to a vertical aerial exit slit. The exit slit moves linearly while the projector moves in a circular arc about a fixed lamp. If the film and motion compensator are in locked motion, stereoscopic motion pictures can be observed by a number of people at the same time without any form of visual aid at their eyes.

2 Claims, 26 Drawing Figures

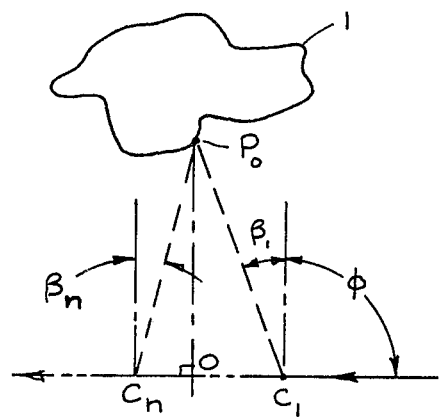
FIG. 1
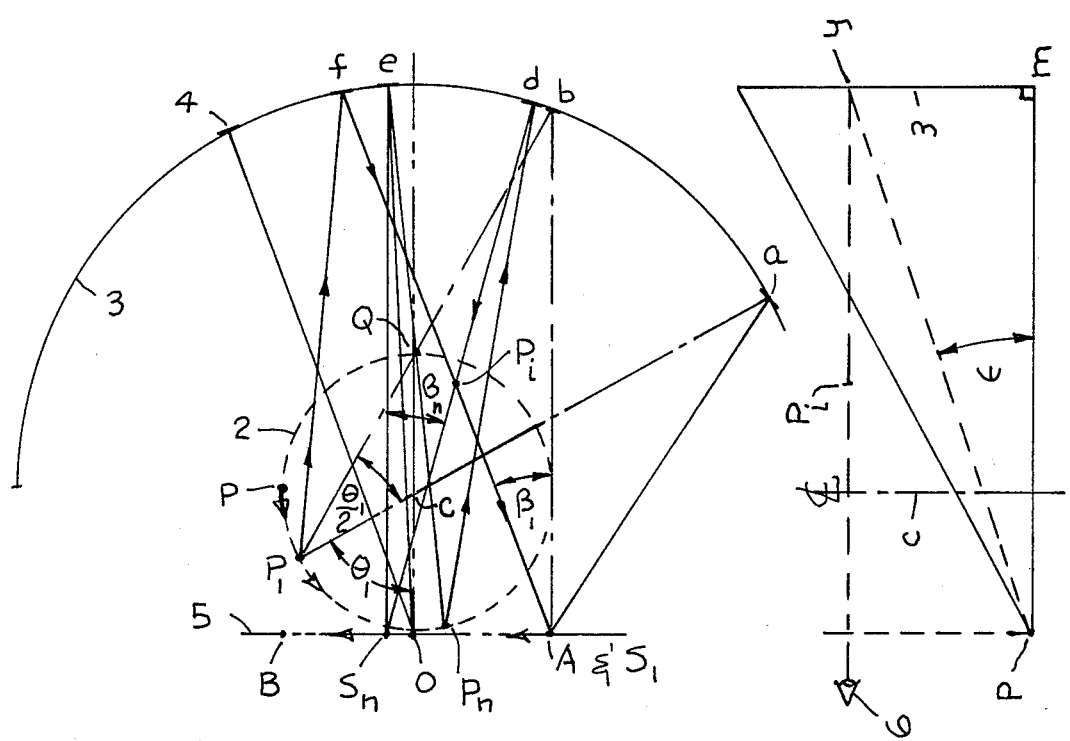
FIG. 2A
FIG. 2B

FIG. 12
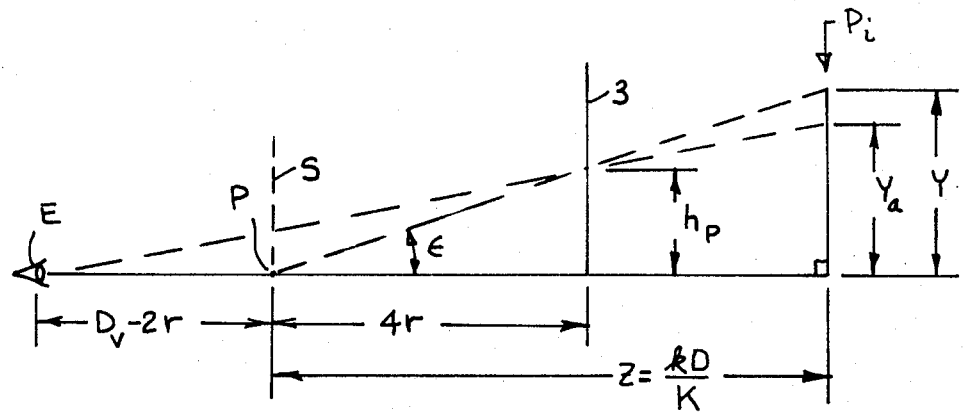
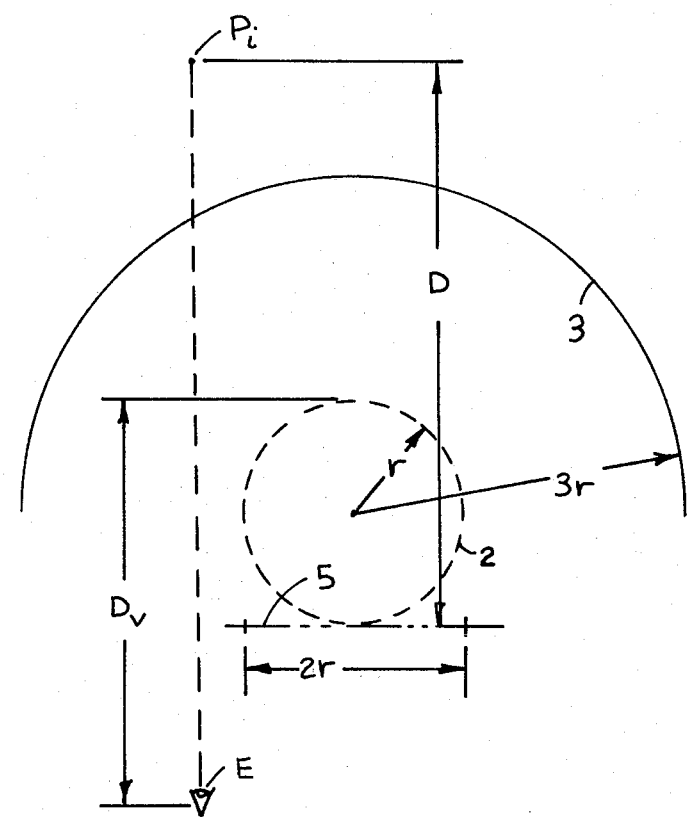
FIG. 13

STEREOSCOPIC MOTION PICTURE-CIRCULAR TO LINEAR SCAN TRANSLATOR-METHOD AND APPARATUS

CROSS-REFERENCES TO RELATED APPLICATIONS

With reference to my U.S. Pat. No. 4,089,597, the projector scanner's circular motion in a horizontal plane causes a vertical aerial exit slit to move in a horizontal circle after the imaging rays are reflected from the semi-specular screen. The photography is either accomplished by a straight line traverse of camera or relative radial traverse as when the camera is stationary and the scene is on a turn table. In the projector, the reconstructed optical axis of the original camera is always parallel but the aerial slit locus is circular and not in a straight line as the camera locus during photography. The result is distortion in the reconstructed image. The distortion varies with relative motion of camera/scene. The effect of this distortion to the observer tends to appear minimal because of the narrow angle of incidence created by the observer's two eyes relative to the wide horizontal angle of view presented. In my new invention, the distortion prevalent in my U.S. Pat. No. 4,089,597 is not present for linear camera/scene relative motion because the locus of the vertical aerial exit slit during playback is a straight line similar to the relative motion of camera/scene during photography and the original camera's optical axis is linearly precessed in the projection to assure that the optical axis remains essentially parallel. The screen size in my new invention is increased by a factor of 3 which multiplies its area by a factor of 9 compared with U.S. Pat. No. 4,089,597. In my new invention, the projection angle is increased, the stereoscopic window is flat compared with a cylindrical shape, the screen's horizontal elemental reflection geometry has its reference common to the collective screen element normals inside of the screen circle rather than on the screen circle as in my U.S. Pat. No. 4,089,597.

BRIEF SUMMARY OF THE INVENTION

My invention relates to a system of recording and stereoscopic viewing of scenes and particularly to a method and means for accomplishing this purpose without viewing aids at the eyes of the observers.

Man has sought for decades to reproduce scenes in stereoscopy without the use of viewing aids at the eyes of the observers and in a manner such that a number of persons might view such scenes at one time and without restriction as to their various individual positions.

I have found that by presenting a relatively large number of related images of the scene to be viewed behind a rapidly moving vertical pseudo optically generated slit aperture the parallax thus occurring prevents one eye of each observer from seeing what the other eye sees at any and every instant of time. The aperture being in motion, each eye sees a complete image within a short interval of time. I make this interval within the persistance of vision for human observers. The brain fuses the two eye observations into a single stereoscopic view image, as my practical results predicate.

Accordingly, I am able to present a stereoscopic view of a scene to one or any reasonable number of viewers. If any or all of the viewers walk around my apparatus they will see the scene in different aspect, just as though they walked around the same scene in real life.

If the scene is reproduced from a series of stationary transparencies taken of the scene according to my method and apparatus the objects within the scene are stationary and a still stereoscopic picture is obtained. If the scene is reproduced from a series of moving transparencies photographed by a motion picture camera such that a relative motion occurs between the camera and scene and the images are reproduced according to my invention, stereoscopic motion pictures are obtained. Motion within the scene will be included and reproduced in the stereoscopic motion picture as well as the scene and camera relative motion.

Considering my system in greater detail, the perspective that one eye of any observer sees is made up of discrete vertical lines of image information taken at discrete instants of time. At these same instants of time the other eye of that observer sees a completely different perspective. The net perspective for the two eyes is different, of course, because the eyes are not coincident in space, but are spaced apart horizontally, as is well known. Considering the image as an entity, it is dissected in time and in space.

An object of my invention is to provide viewing of three dimensional images without the use of viewing aids at the eyes of the observer.

Another object is to provide a stereoscopic system in which various perspectives of the scene viewed may be obtained by changing one's position around the reproducing apparatus.

Another object is to provide a basic stereoscopic motion picture method applicable to known and existing forms of image acquiring processes.

Another object is to provide means for reproducing stereoscopic images that are relatively rugged and are suited to retain adjustment in practice.

Other objects will become apparent upon reading the following detailed specification and upon examining the accompanying drawings, in which are set forth by way of illustration and example certain embodiments of my invention.

BRIEF DESCRIPTION OF ALL DRAWINGS

FIG. 1 shows a simplified plan view of a photographing means according to my invention.

FIG. 2A shows a simplified plan view of the projection system geometry according to my invention.

FIG. 2B shows a side elevation of FIG. 2A.

FIG. 12 shows a side elevation of projection geometry used to compare the relative height of an arbitrary scene object with the apparent height of its reconstruction in projection.

FIG. 13 shows a plan view of projection viewing geometry.

DETAILED DESCRIPTION OF DRAWINGS

Figure 3:
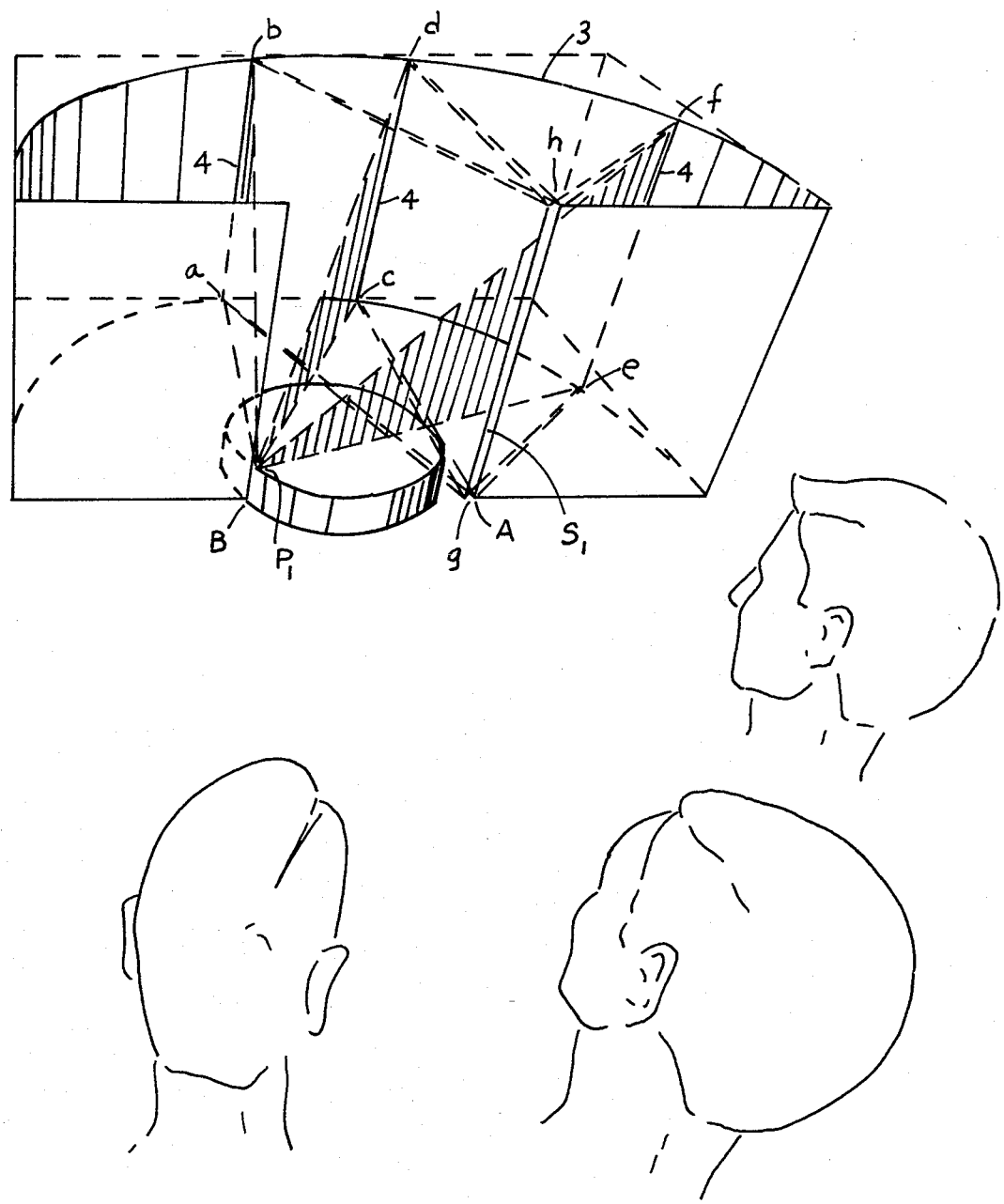
FIG. 3 shows a perspective of FIG. 2.

FIG. 1 shows a plan view of scene photography. A moving picture camera (or equivalent) is moving from right to left and is shown at two arbitrary points $C_1$ and $C_n$. For simplicity of construction and analysis, the camera optical axis at angle $\phi$ to scan path, is shown at 90 degrees. The angle $\phi$ may assume the following angles: $0° \leq \phi \leq 180°$. An object point $P_o$ on scene 1 is arbitrarily chosen. Angles $\beta_1$ and $\beta_n$ are the relative angles that $P_o$ viewing lines make with camera optical axes for camera positions $C_1$ and $C_n$, respectively. My U.S. Pat. No. 4,089,597 of May 5, 1978 (Stereoscopic Motion Picture Scanning Reproduction Method and Apparatus) describes additional camera/scene relative motion in which the scene translates (linearly or rotationaly) past a stationary motion picture camera.

FIG. 2 shows the reproduction method. FIG. 2A is a plan view and FIG. 2B is a side elevation. A projector P rotates in a scan circle 2 of radius r. The rotation direction of P is shown as counterclockwise but could go clockwise as well. The projector P is shown at positions $P_1$ and $P_n$. The projection axis is always directed toward center C. The pictures are precessed during projection so that the camera's original optical axis is always projected through point Q on scan circle 2 and on to the circularly cylindrical screen 3 made of small vertical segments 4 that have the property to reflect horizontally and scatter vertically. Each of the vertical segments 4 are oriented so that its normal passes through point O on scan circle 2. Observers view the stereoscopic pictures through window AB. The geometry of FIG. 2A is such that scan angle $\theta_1$ measured from line OQ defines the position of $P_1$ on scan circle 2 and angle $\theta_1/2$ measured from projector $P_1$ optical axis $P_{1a}$ to original camera optical axis $P_1Qb$ results in reflected ray bA being normal to line 5. Line 5 is normal to OC and is the locus of the aerial exit slit represented by $S_1$ and $S_n$ for the two projector positions $P_1$ and $P_n$. The relative positions of $S_1$ and $S_n$ with respect to O are the same as relative positions of $C_1$ and $C_n$ in FIG. 1 with respect to O on the camera scan path. An aerial exit slit is formed at $S_1$ by all rays leaving $P_1$ and subtend the same angles as the rays leaving $S_1$. The same is true of any position of P and its corresponding S. My U.S. Pat. No. 4,089,597 of May 16, 1978 describes aerial exit slit generation in detail. FIG. 2A shows image point $P_i$ corresponding to object point $P_o$ in FIG. 1. $P_i$ is generated by projector P in position $P_1$ by ray $P_1f$ reflected to $S_1$ and passing through $P_i$ making angle $\beta_1$ to bA. $P_i$ is also generated by projector P in position $P_n$ by ray $P_nd$ reflected to $S_n$ and passing through $P_i$ making angle $\beta_n$ to $eS_n$. Note that $eS_n$ is parallel to OC and results from projecting the original camera $C_n$ optical axis from FIG. 1 through Q to e. The mathematical justification for this geometry is described later in this specification. The straight line scan locus of the aerial exit slit is related to the radius selected for the screen being 3 times the scan circle radius. If the ratio of the two radii is 4, the scan locus bends slightly away from the screen. If the ratio of the two radii is 2, the scan locus bends slightly toward the screen. Any of these ratios will work but the simplicity of linear scan over curved scan makes the optics simpler. The scan window through which stereoscopic motion pictures may be viewed occupies the window width AB along aerial exit slit scan line 5.

FIG. 2B represents a side elevation of FIG. 2A. It is assumed that $P_i$ of FIG. 2A is imaged at an elevation of $\overline{my}$ in FIG. 2B. An arbitrary eye 6 is shown looking in the direction of y on screen 3 as the vertical information for $P_i$ is projected at angle $\epsilon$ from projector P. Supporting equations for vertical as well as horizontal apparent positions of projected images is shown later in this specification.

FIG. 3 shows a perspective of the reproduction system of FIG. 2. Three observers (from an audience of many) are shown observing the stereoscopic picture through window AB. Projection scan circle 2 is shown with projector $P_1$. $P_1$ is shown projecting 3 planes of rays determined by $P_1ab$, $P_1cd$ and $P_1ef$. The reflection of these rays from vertical screen elements 4 follow the rule that rays incident at points a,b,c,d,e or f, scatter to cover vertical aerial exit slit gh which is identified as slit $S_1$.

Figure 4:
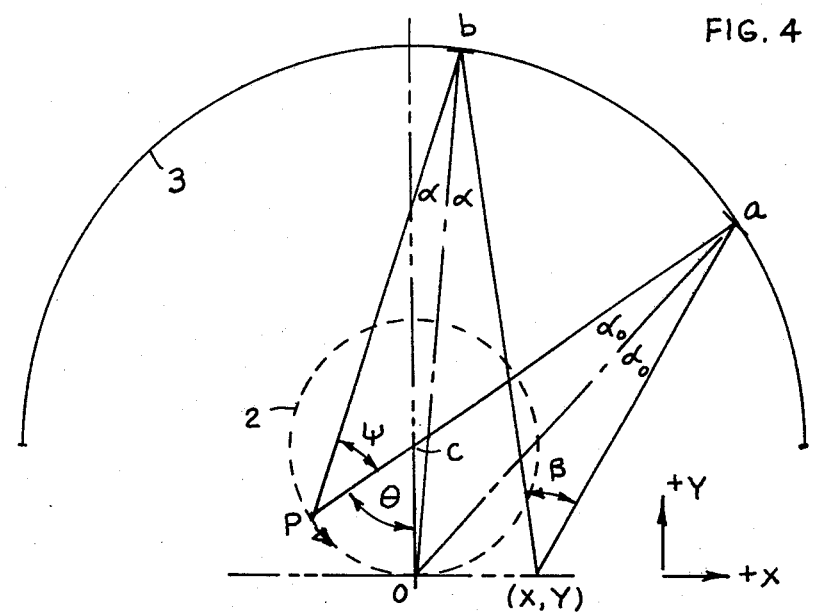
FIG. 4 shows a plan view of the projection geometry to prove that the locus of the aerial exit viewing slit is a straight line through O.

FIG. 4 shows a plan view of the reproduction system. The projection geometry is shown which enables the development of a mathematical expression for the location of the aerial exit slit at position x,y for projector P on scan circle 2. A special ray from P through center C to screen element at position a reflects in the direction of the point x,y. An arbitrary second ray leaving P toward a screen element at position b reflects to develop the intersection point of the aerial exit slit x,y. The screen elements are normal to the line drawn from the screen element to position O in FIG. 4. The convention of sign direction for +x and +y are whown by the arrows and are referenced to point O as the origin of x and y. Equations 1 and 2 represent the expressions of x and y respectively, where the parameters within these expressions are separately listed.

$$x = \frac{(B + C)\cos(\theta - \Psi) - \frac{B\sin(\theta - \Psi)}{\tan(\theta - \Psi - 2\alpha)} - R[3\cos\theta - 3\sin\theta \operatorname{cnt}(\theta - 2\alpha_o) + 1]}{\operatorname{cnt}(\theta - 2\alpha_o) - \operatorname{cnt}(\theta - \Psi - 2\alpha)}$$ Equation (1)

$$y = x \operatorname{cnt}(\theta - 2\alpha_o) + R\left[3\cos\theta - \frac{3\sin\theta}{\tan(\theta - 2\alpha_o)} + 1\right]$$ Equation (2)

where $$A = R\left[1 - \cos\theta + \frac{\sin\theta}{\tan(\theta - \Psi)}\right]$$

$$B = \sqrt{(A - R)^2 \sin^2(\theta - \Psi) - 9R^2} - (A - R)\cos(\theta - \Psi)$$

$$C = \frac{R[(1 - \cos\theta)\tan(\theta - \Psi) + \sin\theta]}{\sin(\theta - \Psi)}$$

$$\tan \alpha = \frac{\sin(\theta - \Psi)}{B/A + \cos(\theta - \Psi)}$$

$$\tan \alpha_o = \frac{\sin\theta}{3 + \cos\theta}$$

Table 1 tabulates the values of x as multipliers of the scan circle radius r for various + and − values of the projection half angle ψ. The values below the "stair-step" in the values of −ψ are not required to be generated. Likewise, table 2 shows the values of y. It can be seen that the locus of the aerial exit slit very closely approximates a straight line drawn through reference O and at right angles to line OC for angle of scan angle θ from 0 to 60 degrees. This is true either side of reference O. The projector scan angle then is about 120 degrees.

TABLE 1

Values of x in FIG. 4
(Multiply all values by r = scan radius)

| | θ Degrees | | | | | |
|---|---|---|---|---|---|---|
| | 10 | 20 | 30 | 40 | 50 | 60 |
| Values of +Ψ° | | | | | | |
| 6 | .174 | .347 | .517 | .681 | .836 | .974 |
| 11 | .174 | .347 | .517 | .683 | .839 | .982 |
| 16 | .174 | .347 | .518 | .684 | .842 | .988 |
| 21 | .174 | .347 | .518 | .684 | .844 | .994 |
| 26 | .174 | .347 | .518 | .684 | .845 | .997 |
| 31 | .174 | .347 | .517 | .684 | .846 | 1.000 |
| 36 | .174 | .347 | .517 | .683 | .845 | 1.001 |
| 41 | .174 | .346 | .516 | .682 | .844 | 1.001 |
| 46 | .174 | .346 | .515 | .680 | .842 | .999 |
| 51 | .174 | .346 | .514 | .678 | .839 | .996 |
| 56 | .174 | .345 | .512 | .675 | .835 | .991 |
| 61 | .174 | .344 | .510 | .672 | .829 | .984 |
| Values of −Ψ° | | | | | | |
| −6 | .174 | .347 | .516 | .676 | .824 | .951 |

TABLE 1-continued

Values of x in FIG. 4
(Multiply all values by r = scan radius)

| | θ Degrees | | | | | |
|---|---|---|---|---|---|---|
| | 10 | 20 | 30 | 40 | 50 | 60 |
| −11 | .174 | .347 | .515 | .674 | .818 | .940 |
| −16 | .174 | .346 | .513 | .670 | .811 | .927 |
| −21 | .174 | .346 | .512 | .667 | .803 | .913 |
| −26 | .174 | .346 | .511 | .663 | .795 | .897 |
| −31 | .174 | .345 | .509 | .658 | .785 | .880 |
| −36 | .174 | .345 | .507 | .653 | .775 | .862 |
| −41 | .174 | .344 | .505 | .648 | .764 | .842 |
| −46 | .174 | .343 | .502 | .642 | .752 | .820 |
| −51 | .174 | .343 | .500 | .635 | .738 | .797 |
| −56 | .174 | .342 | .497 | .628 | .724 | .772 |
| −61 | .174 | .341 | .494 | .620 | .708 | .745 |

TABLE 2

Values of x in FIG. 4
(Multiply all values by r = scan radius)

| | θ Degrees | | | | | |
|---|---|---|---|---|---|---|
| | 10 | 20 | 30 | 40 | 50 | 60 |
| Values of +Ψ° | | | | | | |
| 6 | 0 | 0 | −.004 | −.015 | −.038 | −.078 |
| 11 | 0 | 0 | −.003 | −.011 | −.030 | −.066 |
| 16 | 0 | 0 | −.002 | −.009 | −.025 | −.056 |
| 21 | 0 | 0 | −.002 | −.007 | −.020 | −.048 |
| 26 | 0 | −.002 | −.003 | −.007 | −.018 | −.041 |
| 31 | −.001 | −.003 | −.004 | −.008 | −.017 | −.037 |
| 36 | −.001 | −.004 | −.006 | −.010 | −.018 | −.035 |
| 41 | −.002 | −.006 | −.009 | −.013 | −.020 | −.036 |
| 46 | −.002 | −.008 | −.013 | −.018 | −.025 | −.038 |
| 51 | −.003 | −.010 | −.017 | −.024 | −.031 | −.044 |
| 56 | −.004 | −.013 | −.023 | −.031 | −.040 | −.052 |
| 61 | −.005 | −.017 | −.029 | −.040 | −.050 | −.063 |
| Values of −Ψ° | | | | | | |
| −6 | 0 | −.002 | −.010 | −.028 | −.061 | −.115 |
| −11 | 0 | −.004 | −.014 | −.035 | −.074 | −.133 |
| −16 | 0 | −.005 | −.018 | −.044 | −.088 | −.153 |
| −21 | −.001 | −.007 | −.023 | −.053 | −.103 | −.176 |

TABLE 2-continued

Values of x in FIG. 4
(Multiply all values by r = scan radius)

| | θ Degrees | | | | | |
|---|---|---|---|---|---|---|
| | 10 | 20 | 30 | 40 | 50 | 60 |
| −26 | −.002 | −.009 | −.028 | −.064 | −.120 | −.201 |
| −31 | −.002 | −.012 | −.035 | −.076 | −.139 | −.227 |
| −36 | −.003 | −.015 | −.042 | −.089 | −.160 | −.257 |
| −41 | −.004 | −.018 | −.050 | −.104 | −.183 | −.288 |
| −46 | −.004 | −.022 | −.059 | −.120 | −.208 | −.322 |
| −51 | −.005 | −.026 | −.068 | −.137 | −.235 | −.359 |
| −56 | −.006 | −.031 | −.079 | −.157 | −.264 | −.399 |
| −61 | −.008 | −.036 | −.091 | −.178 | −.296 | −.442 |

Figure 5:
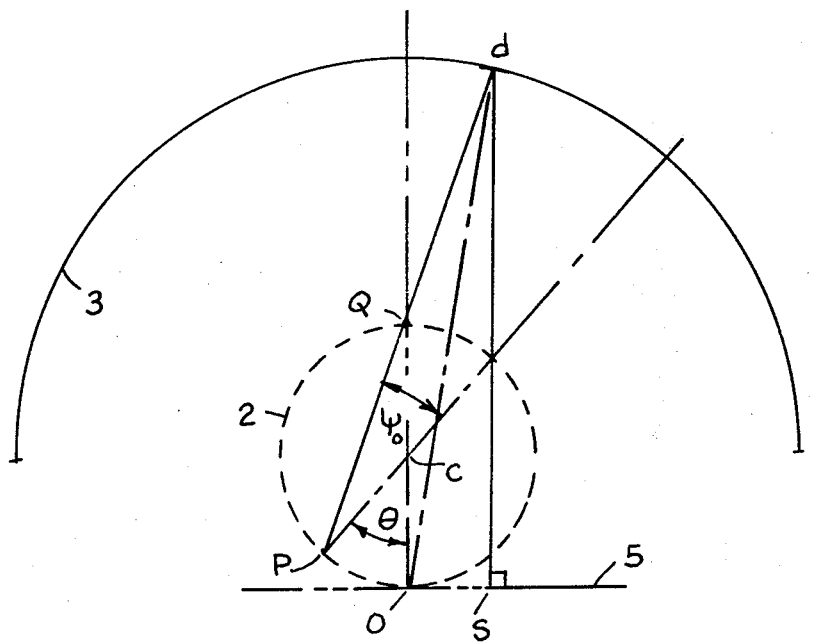
FIG. 5 shows a plan view of the projection geometry for determining the angle between the camera and projector optical axes when the reflected camera optical axis is normal to the aerial exit slit locus.

FIG. 5 shows the same plan view of reproduction system as FIG. 4 except for the special geometry of a ray projected from P that reflects from a screen element d to point S where S is an aerial slit location along aerial exit slit locus line 5 and such that $\overline{dS}$ is at right angles to line 5. With reference to FIG. 5, for all practical purposes, $\psi_o = \theta/2$ and ray $\overline{Pd}$ intersects the scan circle at Q which is also the approximate intersection of $\overline{OC}$ extended to the scan circle. The table below tabulates values of $\psi_o$ based on $\theta$.

| Degrees | |
|---|---|
| $\Psi_o$ | $\theta$ |
| 5.003 | 10 |
| 10.026 | 20 |
| 15.086 | 30 |
| 20.208 | 40 |
| 25.412 | 50 |
| 30.725 | 60 |

The values for $\psi_o$ were evaluated via the Newton method of approximations on computer from the following formula:

$$\sin(\theta - \psi_o)\left[\sqrt{9 - \sin^2\psi_o} - 1\right] - \sin\psi_o[1 + \cos(\theta - \psi_o)] = 0$$

In FIG. 4, the relative value of angle $\beta$ with respect to the half projection angle $\psi$ should be about equal in order that the eye sees the same view as the camera. Equation 3 can be derived from the geometry of FIG. 4. From this equation, table 3 can be constructed to show the values of $\beta$ in terms of both plus and minus values of $\psi$ for various values of projector scan angle $\theta$. The values of $\beta$ below the stair step dividing lines of $-\psi$ in table 3 are not required.

Figure 6:
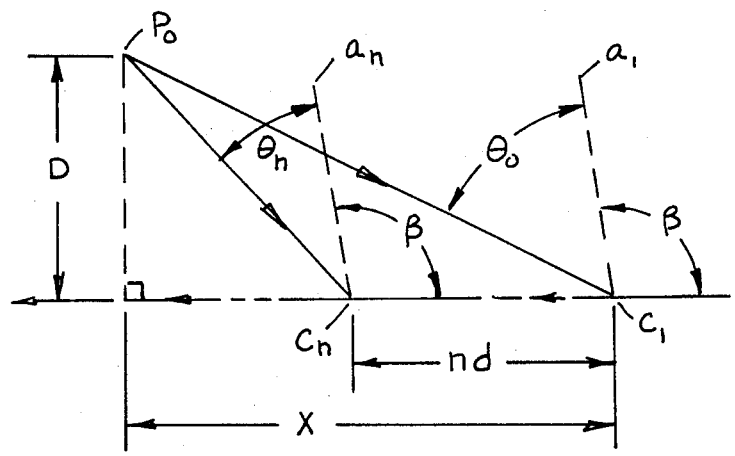
FIG. 6 is a plan view of photographic geometry.

FIG. 6 shows the geometry of photography taken from a plan view of the scene. $P_o$ is an arbitrary object point in the scene. The camera scan path runs along line $C_1C_n$ and the camera's optical axes are $a_1$ and $a_n$ for camera at position $C_1$ and $C_n$ respectively.

$$\beta = \psi + 2\tan^{-1}\left\{\frac{\sin(\theta - \psi) + \sin\psi}{\sqrt{9 - \sin^2\psi} + \cos(\theta - \psi)}\right\} - 2\sin^{-1}\frac{\sin\theta}{\sqrt{10 + 6\cos\theta}} \quad \text{Equation 3}$$

TABLE 3

Values of $\beta$ in Terms of $\psi$ for Various $\theta$
(Reference FIG. 4)

| | θ Degrees | | | | | |
|---|---|---|---|---|---|---|
| | 10 | 20 | 30 | 40 | 50 | 60 |
| Values of $+\Psi$ | | | | | | |
| 5 | 5.00 | 5.05 | 5.14 | 5.27 | 5.44 | 5.68 |
| 10 | | 10.05 | 10.19 | 10.42 | 10.74 | 11.17 |
| 20 | 19.87 | | 20.08 | 20.42 | 20.94 | 21.66 |
| 30 | 29.65 | 29.54 | | 30.02 | 30.63 | 31.51 |
| 40 | 39.32 | 38.96 | 38.93 | | 39.81 | 40.76 |
| 50 | 48.86 | 48.16 | 47.86 | 47.97 | | 49.40 |
| 60 | 58.27 | 57.10 | 56.45 | 56.28 | 56.60 | 57.40 |
| Values of $-\Psi$ | | | | | | |
| −5 | −5.03 | −5.10 | −5.22 | −5.38 | −5.59 | −5.87 |
| −10 | | −10.26 | −10.52 | −10.87 | −11.34 | −11.94 |
| −20 | −20.29 | | −21.39 | −22.25 | −23.36 | −24.76 |
| −22 | | | | | | −27.40 |
| −27 | | | | | −32.20 | |
| −30 | −30.60 | −31.47 | −32.65 | −34.19 | −36.15 | −38.61 |
| −33 | | | | −37.90 | | |
| −40 | −41.04 | −42.48 | −44.37 | −46.80 | | −53.65 |
| −43 | | | −45.80 | | | |
| −47 | −48.40 | | | | | |

Figure 7:
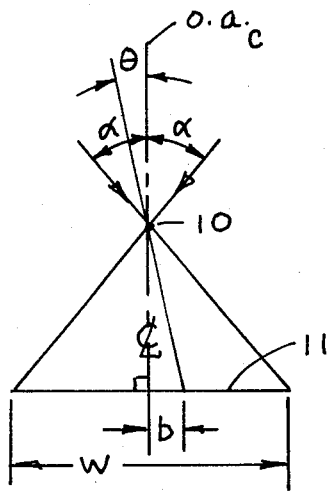
FIG. 7 shows the camera's horizontal angle and an arbitrary scene ray off axis.

The parameter definition of scene photography from FIG. 6 and FIG. 7 is shown in table 4 below.

Table 4—Photography by Linear Scan (photo to right side)

n = number of frames taken from start of scan window
d = distance camera travels between frames
x = horizontal projection of object point on scan path measured from start of scan window
D = distance of object point from scan path
v = velocity of camera
f = pictures/second
α = one half camera's horizontal angle
β = angle of camera optical axis (o.a.) to scan path measured ccw from scan path It can be shown mathematically that $\theta_o$ and $\theta_n$ of FIG. 6 have the following relationships.

$$\tan\theta_o = \frac{1 + \frac{D}{x\tan\beta}}{D/x - 1/\tan\beta} = x/D \text{ for } \beta = 90°$$

$$\tan\theta_n = \frac{1 + \frac{D}{(x - nd)\tan\beta}}{D/x - nd - 1/\tan\beta} = \frac{x - nd}{D} \text{ for } \beta = 90°$$

Figure 8:
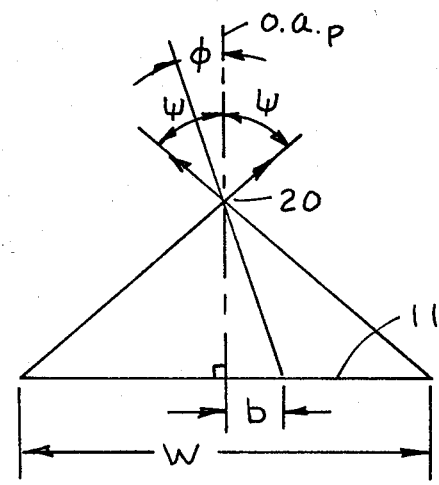
FIG. 8 shows the projector's horizontal angle and the reconstruction of the same off axis arbitrary ray of FIG. 7.

FIG. 7 and FIG. 8 show plan views of camera lens 10 and projection lens 20 as the geometry of image formation proceeds from an arbitrary image formed on the film at horizontal intercept distance b from optical axis o.a.$_c$ and o.a.$_p$. From FIG. 7 and FIG. 8 it can be shown mathematically that:

$$\tan\phi = \tan\psi \tan\theta/\tan\alpha$$

Figure 9:
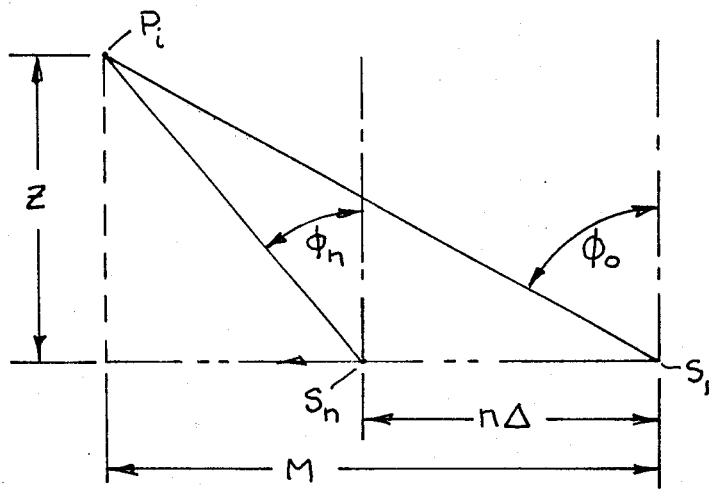
FIG. 9 is a plan view of the projection viewing geometry as related to the photographic geometry of FIG. 6.

FIG. 9 shows the geometry of projection taken from a plan view of the scene. $P_i$ is the location of the image of the object point $P_o$ of FIG. 6. $S_1$ and $S_n$ represent the aerial exit slits for projector $P_1$ and $P_n$ of FIG. 2A respectively. $S_1$ is the start of the projector scan window which scans to $S_n$ corresponding to camera $C_1$ moving to $C_n$ in FIG. 6. The parameter definition for FIG. 9 is shown in table 5 below:

Table 5—Projection by Linear Scan n=number of picture frames in scan window
$\Delta$=distance between adjacent projection points
M=horizontal projection of image point on scan window measured from start of scan window
z=distance of image point from scan window
$\psi$=one half projector's horizontal angle
k=$\Delta$/d (where d is in photo parameters) this scales the size of projection images relative to photographed objects
K=tan $\psi$/tan $\alpha$(where $\alpha$ is in photo parameters)
For $\beta$=90° (for ease of evaluating formulas)

$$\tan \phi_n = (M - n\Delta)/z = K \tan \theta_n = Kx/D$$

and $$\tan \phi_o = M/z = K \tan \theta_o = (K(x - nd)/D)$$

From these formulas, it can be shown that $z = kD/K$ and $M = kx$ when M is measured from the start of the projection scan window. If $K = k = 1$, $\alpha = \psi$ and image and object space in two dimensions (i.e. width and depth) are directly proportional to k.

Figure 10:
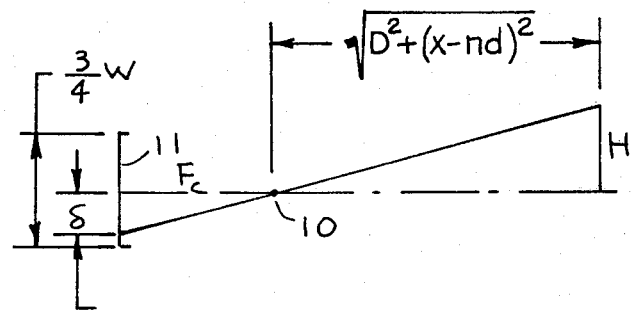
FIG. 10 shows a side elevation of photographic geometry of an arbitrary scene height H.

FIG. 10 shows a side elevation of scene photography. An object at $P_o$ of height H at a distance determined from the formula of FIG. 6 is imaged on film 11 by lens 10 of focal length $F_c$. H occupies height $\delta$ on the film.

Figure 11:
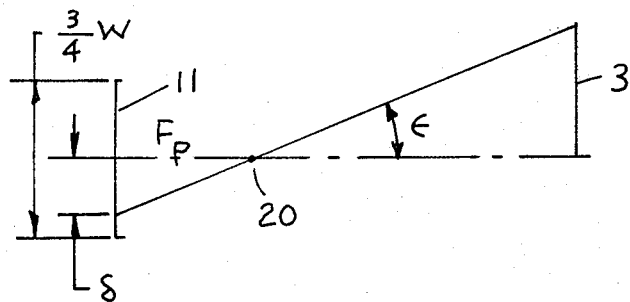
FIG. 11 shows a side elevation of projection reconstruction on the screen of the same arbitrary scene shown in FIG. 10.

In FIG. 11, the height of H is shown by $\delta$ on film 11 and is projected to screen 3 by lens 20 of focal length $F_p$.

$F_c/F_p$ = tan $\psi$/tan $\alpha$ = K = ratio of the tangents of the projection and camera half angles $\psi$ and $\alpha$ respectively. It can be shown that:

$$\tan \epsilon = \frac{KH}{\sqrt{D^2 + (x - nd)^2}}$$

and also that tan $\epsilon = y/z = yK/kD$.

In FIG. 12, y is the ideal image height and $y_a$ is the apparent image height due to finite screen 3 position intercept $h_p$. E is an arbitrary observer's eye. It can be shown that:

$$y_a/y = \frac{4rk(kD/K + D_v - 2r)}{kD(D_v + 2r)}$$

In FIG. 13, the viewing geometry is shown for the projection system construction of FIG. 2A. In the special case that $K = k = 1$, $$y_a/y = \frac{4r(D + D_v - 2r)}{D(D_v + 2r)}$$

Table 6 shows how $y_a/y$ varies with image distance D for various observer's distances.

TABLE 6

| Image Height Behavior with respect to Scene Depth and Viewing Positions | | | | | |
|---|---|---|---|---|---|
| $D_v = 3r$ | | $D_v = 5r$ | | $D_v = 10r$ | |
| $y_a/y$ | D | $y_a/y$ | D | $y_a/y$ | D |
| 1 | 4r | 1 | 4r | 1 | 4r |
| .96 | 5r | .91 | 5r | .87 | 5r |
| .93 | 6r | .86 | 6r | .78 | 6r |
| .88 | 10r | .74 | 10r | .60 | 10r |

TABLE 6-continued

| Image Height Behavior with respect to Scene Depth and Viewing Positions | | | | | |
|---|---|---|---|---|---|
| $D_v = 3r$ | | $D_v = 5r$ | | $D_v = 10r$ | |
| $y_a/y$ | D | $y_a/y$ | D | $y_a/y$ | D |
| .84 | 20r | .66 | 20r | .47 | 20r |

The values of table 6 show that for objects at 4r from aerial slit or from scan path, the apparent height in image space equals height of original object for eyes at any viewing distance. It also shows that the vertical shrinkage of images increases for more distant viewers especially as the distance from aerial slit or from scan path to the object is increased.

Figures 14A, 14B:
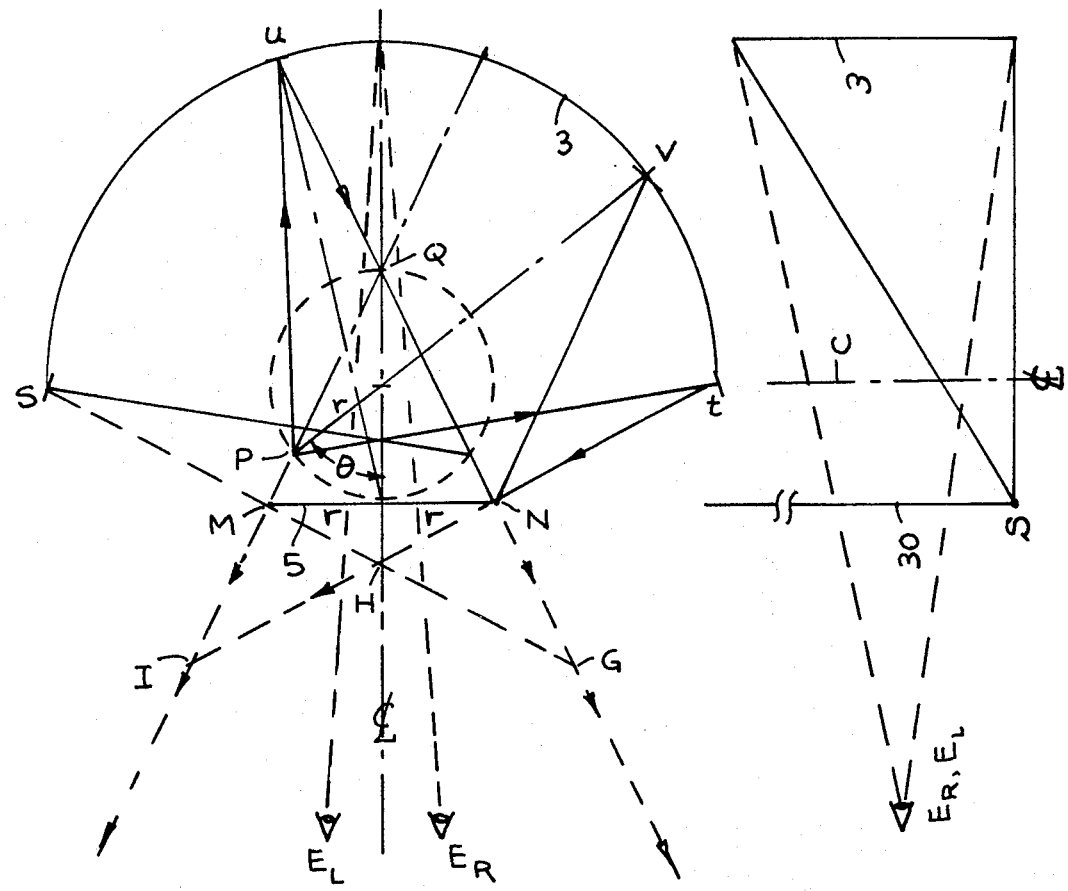
FIG. 14A shows a plan view of audience boundary definition for the projection means according to my invention.
FIG. 14B shows a side elevation of FIG. 14A. $E_L$ and $E_R$ are left and right eyes of an arbitrary observer, respectively.

FIG. 14 shows the viewing boundaries of the audience area. Since the screen 3 reflects as a mirror horizontally and scatters vertically, the audience area is defined by optical limits of the system. FIG. 14A shows a plan view of the projection system with viewing boundaries. Table 7 lists the description of legends for FIG. 14A.

Table 7—Description of Legends for FIG. 14A $\overline{PQ}$=original camera's optical axis
$\overline{PU}$=extreme+ray from scan projector P at $\theta = 60°$
$\overline{UN}$=reflected+ray from screen
$\overline{Pt}$=extreme−ray from scan projector P at $\theta = 60°$
$\overline{tN}$=reflected−ray from screen
Audience Area=anywhere in the dashed region below GH and I
Projection horizontal angle=60°

FIG. 14B shows the side elevation of FIG. 14A. The scan projector rotation axis C is shown with projector P of FIG. 14A exiting as aerial slits along scan line 5 made up of viewing window MN which is shown in FIG. 14B as 30 in elevation. An arbitrary observer's left and right eyes are shown by $E_L$ and $E_R$ respectively in FIG. 14A and FIG. 14B.

Figure 15:
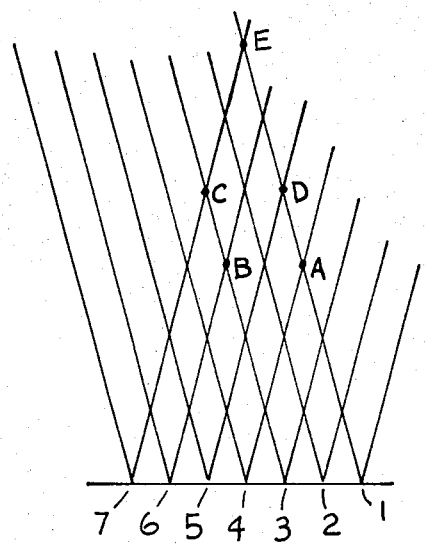
FIG. 15 is a plan view of a photographic means according to my invention where A through E are arbitrary object points and 1 through 7 are successive positions of the translating camera.
Figure 16:
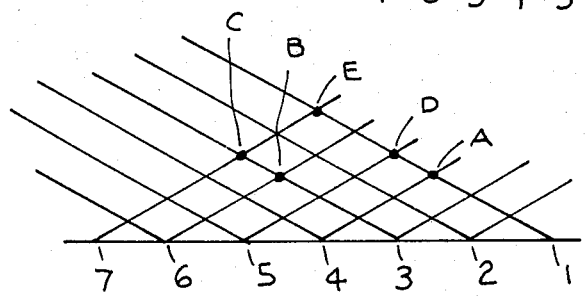
FIG. 16 shows a plan view of the projector's stereoscopic window width between successively generated aerial exit slits 1 through 7 and corresponding reconstruction image points A through E photographed by the translating camera of FIG. 15 and shown in distortion due to $\Delta = 2d$ and $\psi = 4\alpha$.
Figure 17:
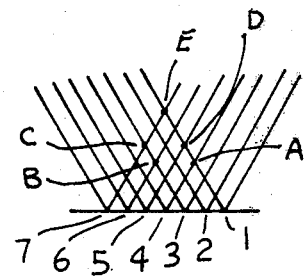
FIG. 17 shows a view similar to FIG. 16 except the $\Delta = d/2$ and $\psi = 2\alpha$.

FIG. 15 shows photography of scene points A through E over a scan window length determined by the camera's travel from position 1 to position 7. FIG. 16 shows what distortion occurs in the projection stereoscopic reconstruction when $\Delta = 2d$ and $\psi = 4\alpha$. FIG. 17 shows what distortion occurs in the projection stereoscopic reconstruction when $\Delta = d/2$, $\psi = 2\alpha$.

Figure 18:
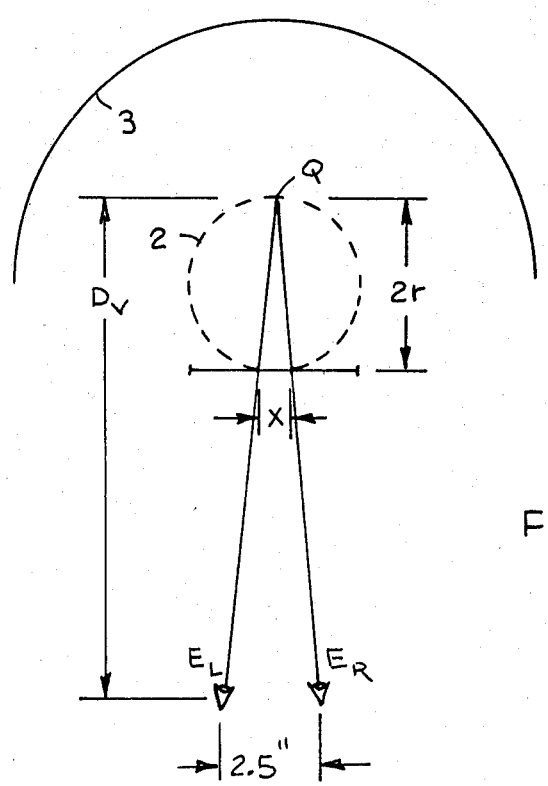
FIG. 18 shows a plan view of projection viewing geometry to determine the number of pictures required within the scan window. $E_L$ and $E_R$ are left and right eyes of an arbitrary observer, respectively.

FIG. 18 shows a plan view of the projection geometry needed to calculate the number of pictures required in the scan window. x is the maximum separation distance between adjacent aerial exit slits. Point Q is the assumed nearest image point in sharp focus. The radius of projection scan circle 2 is r. $D_v$ is the viewing distance to point Q. It can be shown that $x = 5r/D_v$ and $N = 2r/x$ or $N = 0.4D_v$ where $D_v$ is in inches. Experience shows that N can be as low as $0.2D_v$.

Figure 19:
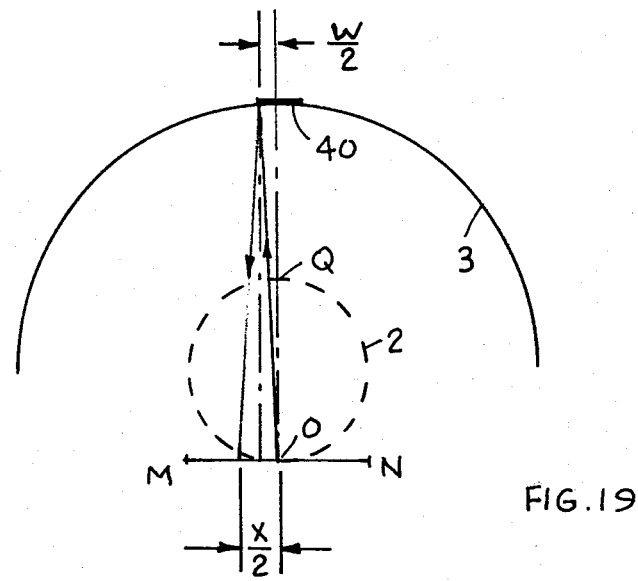
FIG. 19 shows a plan view of projection geometry required for calculation of a screen segment maximum width.

FIG. 19 again shows a plan view geometry needed to determine the maximum allowable width w of a screen segment 40. Screen segments can be constructed from stainless steel vertical flat strips of width w where it can be shown that $w = x/2$. A practical size of the screen segment would be between ¼ and ½ inch. The stainless steel strips would be polished in a manner described in my U.S. Pat. No. 4,089,597 of May 16, 1978.

Figure 20:
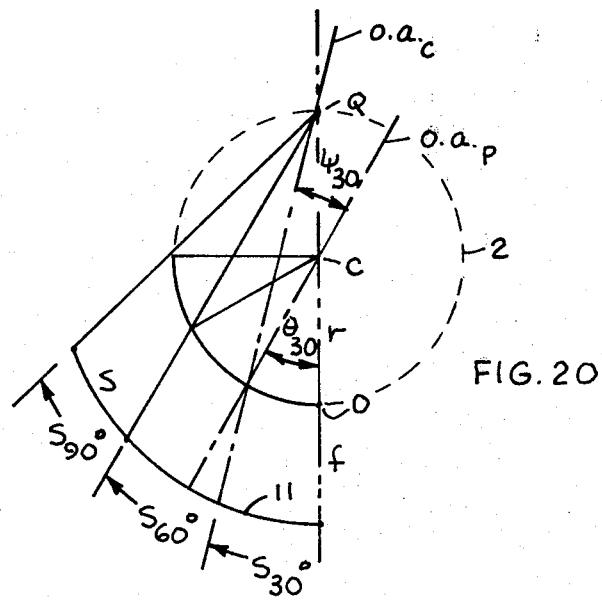
FIG. 20 shows a plan view of a portion of projection geometry with linearly precessed film frames on the film's circular arc which all have their original camera's optical axis projected through point Q.

FIG. 20 shows the geometric test for precession of the camera's optical axis (o.$a_c$) with respect to the projector's optical axis (o.$a_p$). o.$a_p$ is always through scan center C, but o.$a_c$ must pass through Q for any scan angle $\theta$. The arc of film 11 is arbitrarily shown concentric with C. Since film 11 has picture frames at regular intervals, it must be shown that for any of the scan angles $\theta$ from 0 to 60 degrees, that precession of o.$a_c$ will allow projection toward point Q. S is the arbitrary arc length measured along film 11. It can be shown that:

$$S = (r+f)\left\{\theta/2 + \sin^{-1}\left[\frac{r}{(r+f)}\sin\frac{\theta}{2}\right]\right\}$$

or for $$\left\{\theta/2 + \sin^{-1}\left[\frac{1}{1+f/r}\sin\frac{\theta}{2}\right]\right\}$$

The worst error will occur at the maximum desired scan angle of $\theta = 60$ degrees. It can be shown that the following errors occur for various values of f/r at $\theta = 60°$:

TABLE 8

| f/r | error % | o.$a_c$ Precession Errors S | $S_{ideal}$ | Remarks |
|---|---|---|---|---|
| 0.1 | 0.41 | | | |
| 0.5 | 1.06 | 1.2952 | 1.309 | |
| 0.93 | 1.162 | | | |
| 0.94 | 1.1622 | | | max. error |
| 1.0 | 1.16 | 1.5525 | 1.5707 | |
| 1.5 | 1.1 | | | |
| 2.0 | 1.01 | | | |
| 20.0 | 0.2 | | | |

Note:
for actual values of S, multiply by r.

It can be concluded from table 8 that linearity is well within accepted tolerance so that the film frame centerlines representing the camera's optical axes (being equally separated) and the equally separated adjacent projection locations can be properly precessed to result in a value of $\psi$ equal to $\theta/2$ (all passing through point Q in FIG. 20.

Figures 21A, 21B:
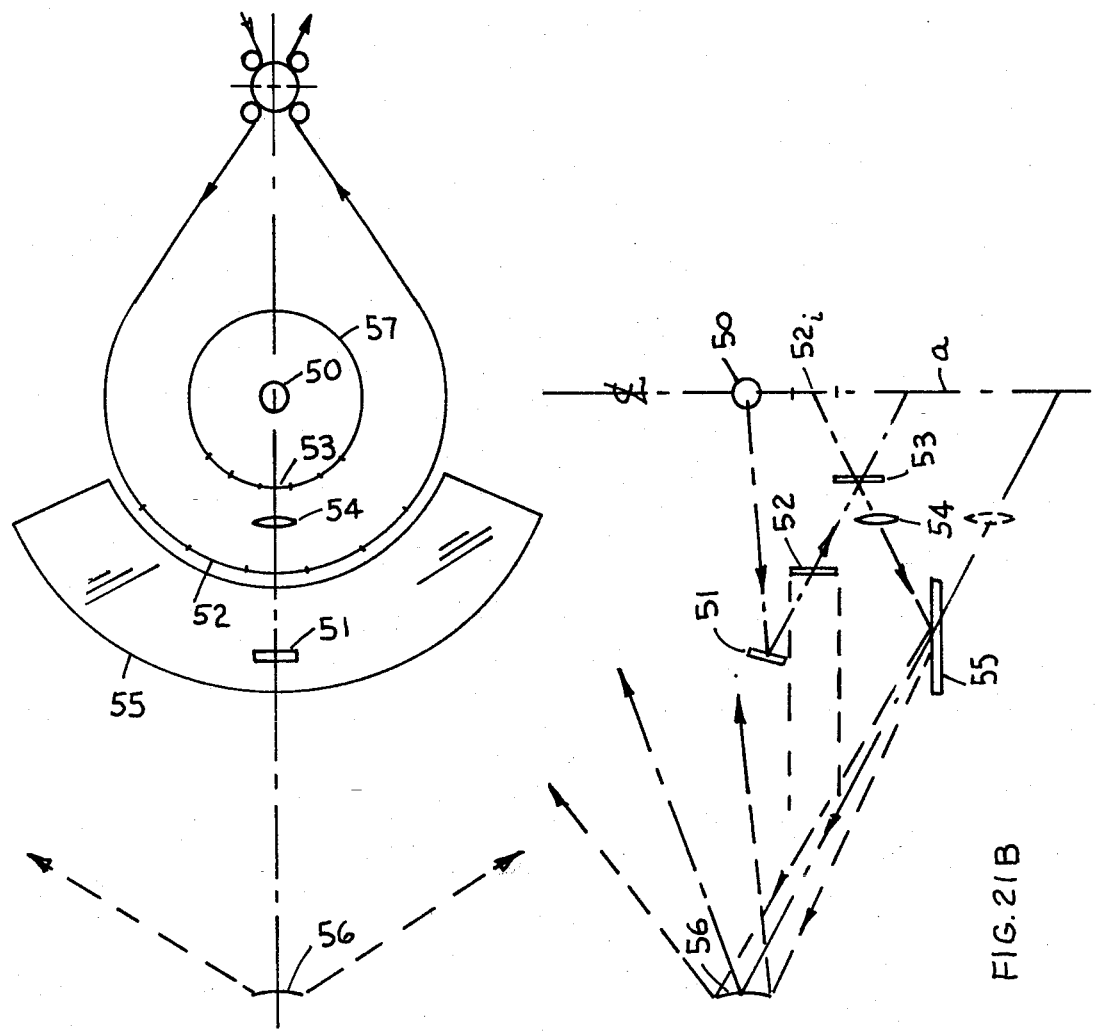
FIG. 21A shows a plan view of a portion of a projection system embodiment according to my invention using a multi-facet mirror drum image motion stabilizer and a two facet optical scanner.
FIG. 21B shows a side elevation of FIG. 21A.

FIG. 21A and FIG. 21B show plan and side elevation views respectively of one method of projection using a mirror drum image motion compensator that allows the film to move continuously. Only one scan facet is shown in the drawings. For a two facet system, the other facet is 180 degrees away from the one shown. A facet of projection is defined as all of the optics from the projection lamp to the last element of projection optics. The principle of mirror drum image motion compensation for continuously moving film is covered in my U.S. Pat. No. 4,089,597 of May 16, 1978. Projection lamp 50 light is diverted by scanning mirror 51 through circular film 52 which is imaged on rotation axis-a by mirror drum 57 mirror facet 53 as 52$_i$ and projected by scanning projection lens 54 onto horizontal fixed mirror 55 which reflects the projected images in sequence to aspheric wide angle projection mirror 56 which in turn reflects the picture to cylindrical screen 3 of FIG. 2A. The optical axis of projection lens 54 is maintained normal to projection screen 3 of FIG. 2A to eliminate vertical keystone distortion. Film 52 picture frames are precessed to mirror drum 57 in accord with method described in FIG. 20.

Figures 22A, 22B:
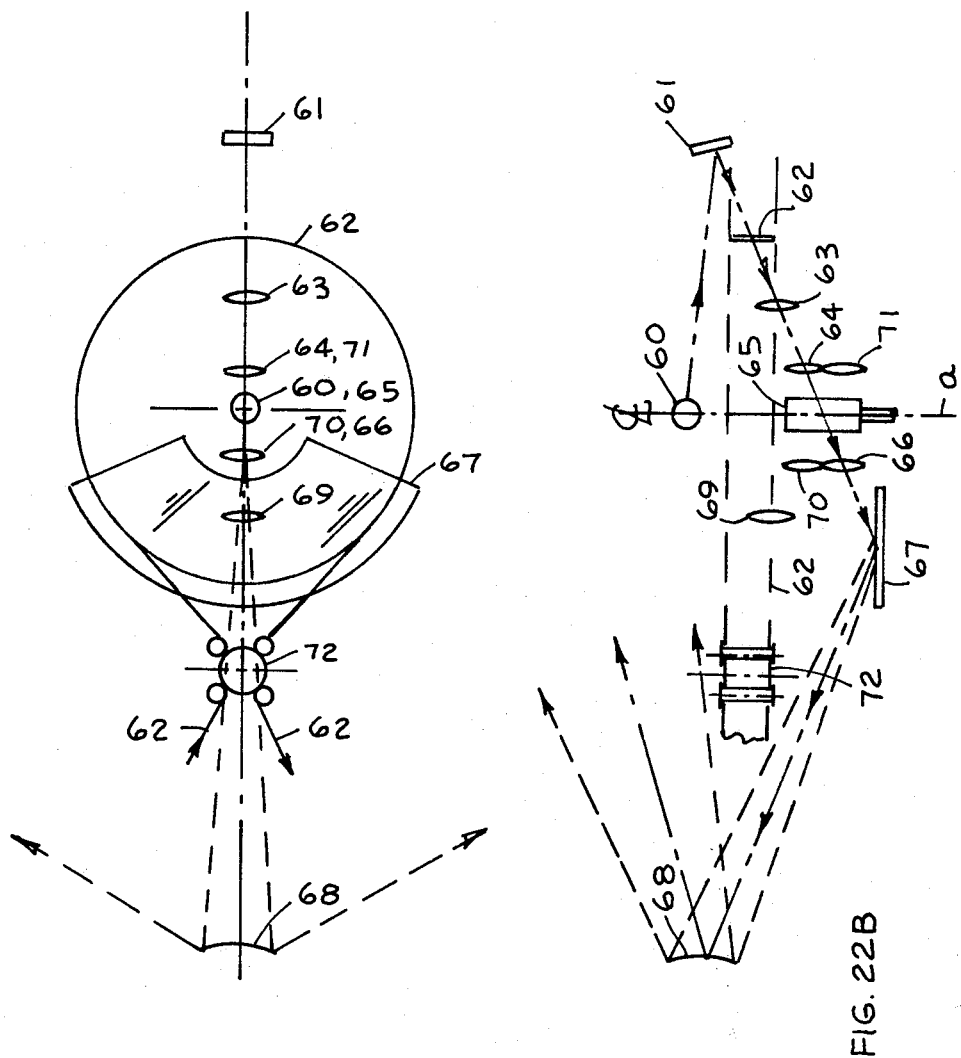
FIG. 22A shows a plan view of a portion of an alternate projection system embodiment according to my invention using a multi-facet central rotating prism image motion stabilizer and a two facet optical scanner.
FIG. 22B shows a side elevation of FIG. 22A.

FIG. 22A and FIG. 22B are plan and elevation views respectively of an alternate projection system method using a prism compensator, two facets of which are shown in the figures. The principle of image motion compensation using a prism and continuously moving film is covered in my U.S. Pat. No. 4,089,597 of May 16, 1978. In FIG. 22A and FIG. 22B, light from projection lamp 60 reflects from scanning mirror 61 through film 62 and is relayed to scanning field lens 64 by scanning relay lens 63. Scanning projection lens 66 views the film image in field lens 64 through multi-facet prism 65 rotating at high speed on axis-a. The projected picture reflects from stationary horizontal plane mirror 67 to the aspheric reflecting mirror 68 which directs the picture to screen 3 described in FIG. 2A. The other projection facet picks up the same light from lamp 60–180 degrees later in the cycling of the projector scanner and scanning relay lens 69 images film 62 onto scanning field lens 70. In this case, projection lens 71 is used. All of the lenses have their optical axes normal to screen 3 of FIG. 2A to eliminate vertical keystone distortion.

Alternate projection methods utilize fixed optics at each projection point with a central wide horizontal angle strobe projection lamp and continuous film or the film can be intermittently advanced when a constant intensity wide horizontal angle projection lamp is used. The film or projection frame media (reflective or transmissive) may remain stationary in the alternate projection methods.

Having thus fully described my invention and the manner in which it is to be practiced, I claim:

1. A method of recording and reproducing stereoscopic views for observation by plural observers without visual aids at the eyes of said observers, comprising:
    photographing multiple sequential views of a scene from a motion picture camera in a manner such that between each sequential view relative motion takes place between the camera and scene and the optical axis of the camera for the various views is essentially coincident or parallel with each other; reproducing said views sequentially by projecting the views from a scanning projector onto a screen; said scanning projector being positioned, during the projection of successive views, at successive positions about the arc of a projection circle so as to project the images to said screen on the opposite side of said projection circle; said screen being stationary, of larger radius and concentric with said projection circle and comprised of elementary vertical sections having horizontal corrugated ridges to vertically scatter and horizontally reflect incident light rays from said projector, said vertical sections so oriented that the normal line to each vertical section passes through a single reference point, said reference point being located on the opposite side of said projection circle center from said screen and on a line bisecting said screen, said line passing through said projection circle center; said scanning projector constrained to project said sequential views toward a common point located on said bisecting line between said projection circle center and said screen; and the scanning of said projector being at a rate sufficient to be within the period of persistence of vision of an observer.

2. A construction for displaying motion pictures stereoptically to observers situated in front of the viewing screen of said construction, said construction including:
    a stationary reflective viewing screen comprised of vertical sections having horizontal corrugated ridges, said screen arranged in a circular arc having a vertical axis, one or more projectors rotating about said vertical axis on a smaller radius than said screen while projecting a sequence of pictures onto said screen, a multi-facet mirror drum with rotating axis coincident with said vertical axis, a motion picture film constrained to a circular film guide having axis coincident with said vertical axis, each sequential picture frame of said film slightly shifted laterally with respect to a given mirror facet of said mirror drum so that the direction of projection of the optical axis for all views photographed, is toward a common point located between said vertical axis and said screen, said screen reflecting said sequential views projected by said projector to a horizontally moving vertical aerial exit slit.

* * * * *

UNITED STATES PATENT AND TRADEMARK OFFICE
CERTIFICATE OF CORRECTION

PATENT NO. : 4,231,642
DATED : Nov 4, 1980
INVENTOR(S) : Robert B. Collender

It is certified that error appears in the above—identified patent and that said Letters Patent is hereby corrected as shown below:

Column 6 and Table 2 heading "Values of x in FIG. 4"
should read "Values of y in FIG. 4".
Column 7 and Table 2- same as column 6 note
Column 9 and Table 6, 3rd column heading "yay"
should read $y_a / y$
Column 10 and Table 6- same as column 9 note
Column 11- The math expression between lines 11 and 16 should read:

or for S (normalized) = S' = S/r =

(1+f/r)

Signed and Sealed this

*Twenty-second* Day of *September 1981*

[SEAL]

*Attest:*

GERALD J. MOSSINGHOFF

*Attesting Officer*     *Commissioner of Patents and Trademarks*

UNITED STATES PATENT AND TRADEMARK OFFICE
CERTIFICATE OF CORRECTION

PATENT NO. : 4,231,642
DATED : Nov 4, 1980
INVENTOR(S) : Robert B. Collender

It is certified that error appears in the above—identified patent and that said Letters Patent is hereby corrected as shown below:

Column 6 and Table 2 heading "Values of x in FIG. 4" should read "Values of y in FIG. 4".
Column 7 and Table 2- same as column 6 note
Column 9 and Table 6, 3rd column heading "yay" should read $y_a / y$
Column 10 and Table 6- same as column 9 note
Column 11- The math expression between lines 11 and 16 should read:

or for S (normalized) = S' = S/r =

(1+f/r) (the expression in this bracket is OK as is).

This Certificate supersedes Certificate of Correction issued September 22, 1981.

Signed and Sealed this

*Twenty-second* Day of *December 1981*

[SEAL]

*Attest:*

GERALD J. MOSSINGHOFF

*Attesting Officer*  *Commissioner of Patents and Trademarks*